United States Patent
Lu et al.

(10) Patent No.: US 9,396,723 B2
(45) Date of Patent: Jul. 19, 2016

(54) METHOD AND DEVICE FOR ACOUSTIC LANGUAGE MODEL TRAINING

(71) Applicant: Tencent Technology (Shenzhen) Company Limited, Shenzhen (CN)

(72) Inventors: Duling Lu, Shenzhen (CN); Lu Li, Shenzhen (CN); Feng Rao, Shenzhen (CN); Bo Chen, Shenzhen (CN); Li Lu, Shenzhen (CN); Xiang Zhang, Shenzhen (CN); Eryu Wang, Shenzhen (CN); Shuai Yue, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 405 days.

(21) Appl. No.: 14/109,845

(22) Filed: Dec. 17, 2013

(65) Prior Publication Data
US 2014/0222417 A1 Aug. 7, 2014

Related U.S. Application Data

(63) Continuation of application No. PCT/CN2013/085948, filed on Oct. 25, 2013.

(30) Foreign Application Priority Data

Feb. 1, 2013 (CN) .......................... 2013 1 0040085

(51) Int. Cl.
*G10L 15/00* (2013.01)
*G10L 15/06* (2013.01)
(Continued)

(52) U.S. Cl.
CPC .............. *G10L 15/063* (2013.01); *G06F 17/28* (2013.01); *G10L 15/183* (2013.01)

(58) Field of Classification Search
CPC ...... G10L 15/063; G10L 15/183; G06F 17/28
USPC ........................................................... 704/9
See application file for complete search history.

(56) References Cited

U.S. PATENT DOCUMENTS

| 5,195,167 A | * | 3/1993 | Bahl | ..................... G10L 15/063 704/200 |
| 6,188,976 B1 | * | 2/2001 | Ramaswamy | ........ G10L 15/183 704/1 |

(Continued)

FOREIGN PATENT DOCUMENTS

| CN | 1346126 A | 4/2002 |
| CN | 1645478 A | 7/2005 |

(Continued)

OTHER PUBLICATIONS

Tencent Technology, ISR, Jan. 30, 2014, 3 pgs.
Tencent Technology, Written Opinion, PCT/CN2013/085948, Jan. 30, 2014, 3 pgs.
Tencent Technology, International Preliminary Report on Patentability, PCT/CN2013/085948, Aug. 4, 2015, 4 pgs.

*Primary Examiner* — Daniel Abebe
(74) *Attorney, Agent, or Firm* — Morgan, Lewis & Bockius LLP

(57) ABSTRACT

A method and a device for training an acoustic language model, include: conducting word segmentation for training samples in a training corpus using an initial language model containing no word class labels, to obtain initial word segmentation data containing no word class labels; performing word class replacement for the initial word segmentation data containing no word class labels, to obtain first word segmentation data containing word class labels; using the first word segmentation data containing word class labels to train a first language model containing word class labels; using the first language model containing word class labels to conduct word segmentation for the training samples in the training corpus, to obtain second word segmentation data containing word class labels; and in accordance with the second word segmentation data meeting one or more predetermined criteria, using the second word segmentation data containing word class labels to train the acoustic language model.

20 Claims, 6 Drawing Sheets

(51) Int. Cl.
*G06F 17/28* (2006.01)
*G10L 15/183* (2013.01)

(56) References Cited

U.S. PATENT DOCUMENTS

| | | | |
|---|---|---|---|
| 6,484,136 B1 * | 11/2002 | Kanevsky | G06F 17/2765 704/255 |
| 6,904,402 B1 * | 6/2005 | Wang | G06F 17/274 704/1 |
| 7,275,029 B1 * | 9/2007 | Gao | G06F 17/2735 704/1 |
| 2008/0052075 A1 | 2/2008 | He et al. | |
| 2009/0313019 A1 | 12/2009 | Kato et al. | |
| 2012/0221339 A1 | 8/2012 | Wang et al. | |

FOREIGN PATENT DOCUMENTS

| | | |
|---|---|---|
| CN | 101261832 A | 9/2008 |
| CN | 102543080 A | 7/2012 |
| CN | 102568477 A | 7/2012 |
| EP | 1168301 A1 | 1/2002 |
| EP | 1528639 A | 5/2005 |
| JP | 2000298498 A | 10/2000 |
| TW | 1297487 B | 6/2008 |
| TW | 201021024 A | 6/2010 |
| WO | WO 2007051940 A1 | 5/2007 |

* cited by examiner

METHOD AND DEVICE FOR ACOUSTIC LANGUAGE MODEL TRAINING

RELATED APPLICATIONS

This application is a continuation application of PCT Patent Application No. PCT/CN2013/085948, entitled "METHOD AND DEVICE FOR ACOUSTIC LANGUAGE MODEL TRAINING" filed Oct. 25, 2013, which claims priority to Chinese Patent Application Serial No. CN201310040085.1, entitled "Method and Device for Training Acoustic Language Models" filed Feb. 1, 2013, both of which are incorporated herein by reference in their entirety.

FIELD OF THE INVENTION

The present application relates to the field of natural language processing technology, especially relates to a method and device for training acoustic language models.

BACKGROUND OF THE INVENTION

As computer applications become more and more popular, there is an increasing user expectation for direct natural language communication with computers, because natural language is the most convenient, effective, and speedy form of communication method for human beings. Speech recognition technology is a technology for changing human speech signals into corresponding text through computer-based recognition and understanding processes. Language models play an important role of improving the accuracy of speech recognition.

Due to the limitation of hardware performance and software algorithms, current speech recognition systems pose strict limits on the size of language models. Correspondingly, the size of a language model grows exponentially with increasing vocabulary size covered by the language model. Due to these two reasons, the available vocabulary size of a speech recognition system cannot be expanded indefinitely. Under the condition of current technology, the upper limit of glossary capacity of a speech recognition system is slightly over one hundred thousand. For words outside of the glossary, the recognizing accuracy of speech recognition system will decline significantly.

Moreover, there exist millions of words with low usage frequencies in the normal speech environment. For example, these may be words that are relevant only for a short time (e.g., names of TV programs or movies); words that are relevant only to a particular geographic region (e.g., names of local restaurants), or words that just appear in a certain professional field (e.g., technical terms or jargons), and so on. For these and other reasons, there exists the phenomenon that there are a large body of low-frequency words in which each word has a very low statistical significance.

Therefore, there is an urgent need for solving the problem of how to expand the vocabulary coverage of a language model without significantly increasing the size of the language model or compromising its computation accuracy.

SUMMARY

The present application proposes a method and device for training an acoustic language model for speech recognition, that expands the vocabulary coverage of the language model and thereby improving the recognition accuracy of the speech recognition system.

In one aspect, a method of training an acoustic language model includes: at a device having one or more processors and memory: conducting word segmentation for training samples in a training corpus using an initial language model containing no word class labels, to obtain initial word segmentation data containing no word class labels; performing word class replacement for the initial word segmentation data containing no word class labels, to obtain first word segmentation data containing word class labels; using the first word segmentation data containing word class labels to train a first language model containing word class labels; using the first language model containing word class labels to conduct word segmentation for the training samples in the training corpus, to obtain second word segmentation data containing word class labels; and in accordance with the second word segmentation data meeting one or more predetermined criteria, using the second word segmentation data containing word class labels to train the acoustic language model.

In some embodiments, a system for training an acoustic language model includes: one or more processors and memory having instructions stored thereon, the instructions, when executed by the one or more processors, cause the processors to perform the above method.

According to the above technical solutions, some embodiments include utilizing an initial language model containing no word class labels to perform word segmentation on language samples in a training corpus, and thereby obtaining initial word segmentation data containing no word class labels; performing word class replacement for at least some words in the initial word segmentation data, and thereby obtaining first word segmentation data containing word class labels; training a first language model containing word class labels using the first word segmentation data, and utilizing the first language model to perform word segmentation on the training samples in the training corpus, and thereby obtaining second word segmentation data containing word class labels; and utilizing the second word segmentation data containing word class labels to train the acoustic language model. Therefore, embodiments of the above solutions realize training of an acoustic language model based on word segmentation data containing word class labels. Word class labels can be used to replace all words (e.g., entity names) belonging to that class in the training language samples, and thereby reducing the total vocabulary count in the language model. When calculating the probability associated with particular words (e.g., particular entity names) of a given word class, parameters associated with that given word class in the language model are used in the calculation. The present solutions can expand the vocabulary coverage of the language model and thereby improve the recognition accuracy of the language model. In addition, the present solutions address the problem of poor recognition results for out-of-glossary words due to the limited glossary capacity of the speech recognition system.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Figure 1A:
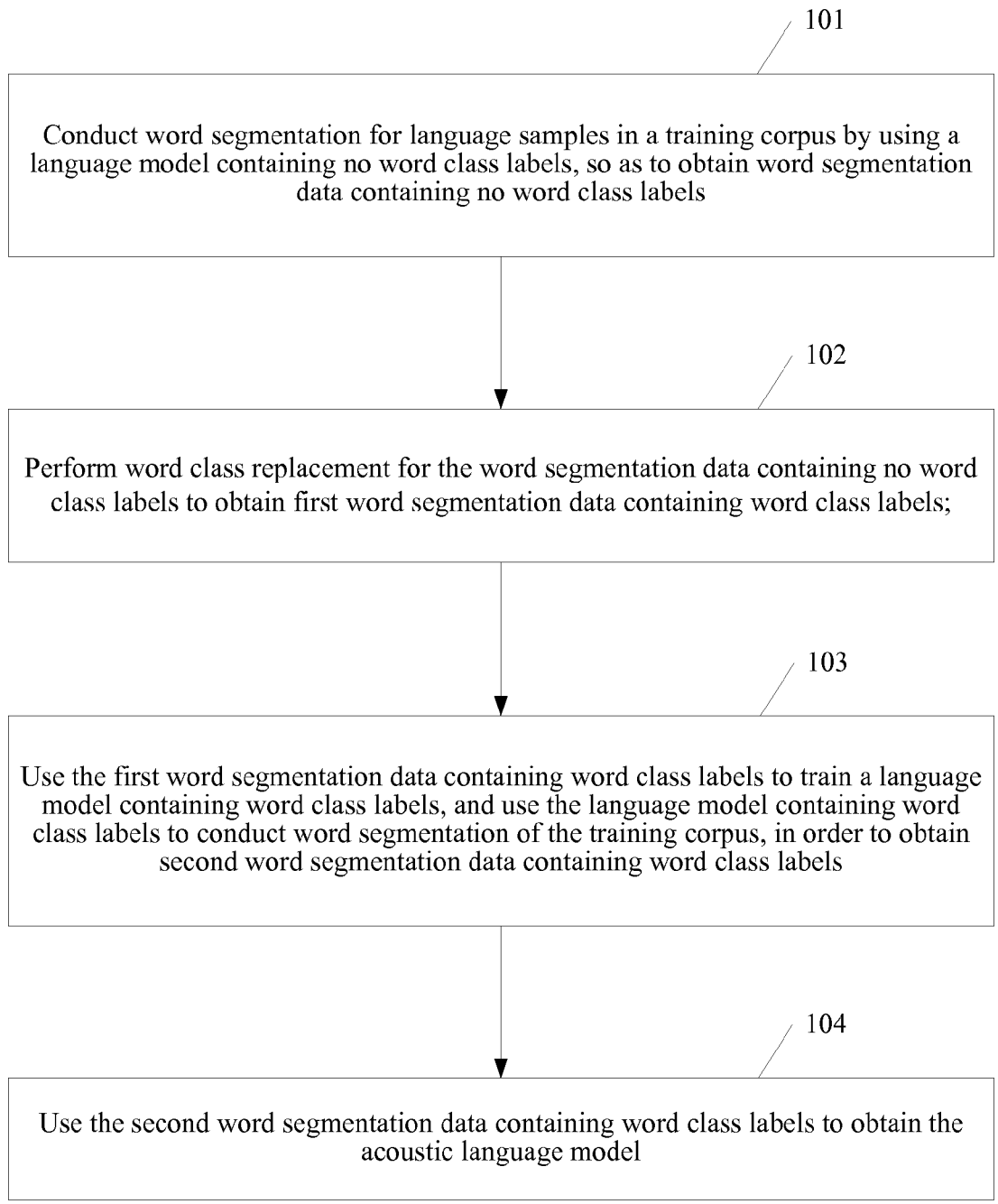
FIG. 1A is a flow diagram of an acoustic language model training method in accordance with some embodiments.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make a clearer understanding of purpose, technical scheme and advantages of the present application, the present application is described in detail below in combination with the attached drawings.

In some embodiments, knowledge of the following characteristics of vocabulary is taken into consideration:

(1) A large number of low-frequency words are entity names, such as: the names of people, books, movies, places, and other named entities.

(2) The context information of entity names of the same word class exhibits similarities, e.g., if different entity names of the same word class are placed into the same textual context (e.g., surrounding text in a sentence), the ideographic ability of the sentence are hardly affected. For example: the sentence "I like watching the cartoon 'Crayon Shin-Chan'" and the sentence "I like watching the cartoon 'Chibi Maruko Chan'" have pretty similar ideographic abilities.

According to the above characteristics, embodiments of the present application propose a strategy for training an acoustic language model based on word segmentation according to word classes.

As described herein, a word class refer to a set containing words that (e.g., entity names) are similar according to the statistical characteristics of their textual context (e.g., the probability of occurrences for the word in all given textual contexts).

As described herein, word segmentation refers to the process of dividing a continuous language sample (e.g., a text string) into a sequence of unambiguous semantic units (e.g., words). For example, in the Chinese language, a textual string containing Chinese characters or Pinyin does not include natural delimiters between words, and the divisions between semantic units within the textual string are not apparent. Therefore, in order to interpret the meaning of the textual string, the string is segmented into a sequence of chunks each representing a respective word.

As described herein, word class labeling or word class replacement refers to a process of substituting or replacing a word (e.g., an entity name) in a language sample (e.g., a training language sample) with its corresponding word class label. For example, the sentence "I like watching the cartoon 'Crayon Shin-Chan'" can be converted to another sentence "I like watching the cartoon <cartoon name>" through word class replacement, in which the word "Crayon Shin-Chan" is replaced with its class label "<cartoon name>". Word class replacement may be performed on multiple words of a sentence. The result of word class replacement is a more generic sentence, and statistics associated with training samples that result in the same generic sentence through word class replacement can be combined to generate statistics associated with the generic sentence. When the generic sentence is used in the training of a language model, the resulting language model is a language model containing word class labels. Training using generic sentences containing word class labels addresses the problem of data sparseness for training samples that contain specific low-frequency words (e.g., the words that have been replaced with their corresponding class labels).

As described herein, word segmentation based on word class labels refer to a way of segmenting a language sample in which word class labels are represented in the probability paths of the candidate segmentation results, and if a word class appears in the best path, then the word class label of specific words (e.g., entity names) appears in the corresponding position in the segmentation result. For example, if the path having the highest probability among a plurality of possible segmentation paths is "[word i][word j][<word class p>][word k]", then the segmentation result is "[word i][word j][<word class p>][word k]". This segmentation result would be valid for all sentences of the form "[word i][word j][string x][word k]" where [string x] is a word in the word class <word class p>.

As described herein, a language model refers to a probability model that, for a given historic word sequence, provides the probabilities of occurrences for words succeeding the given historic word sequence, e.g., based on n-gram statistics and a smoothing algorithm.

Language models are often used in many natural language processing aspects, such as speech recognition, machine translation, part-of-speech tagging, syntax analysis, information retrieval, and so on. Since the lengths of words and sentences can be arbitrary, there may be rare or unseen strings not adequately covered by a trained language model (e.g., due to the problem of data sparseness during language model training). This will make the estimation of the probability of strings in the corpus difficult, and is also one of the reasons for using an approximate smooth N-gram model.

In accordance with some embodiments of the present application, word class labels are used to replace all words (e.g., entity names) of corresponding word classes in the training samples (e.g., text samples) of the training corpus. Consequently, since a great number of words (e.g., entity names) of the same word class are expressed as the same word class label in the language model, the vocabulary size of the language model can be reduced without compromising the vocabulary coverage of the language model. When calculating the probabilities for the words (e.g., entity names) of the same word class, parameters of the word class label in the language model are used. For words (e.g., entity names) that did not appear in the training text, as long as the word class label representing this kind of words (e.g., entity names) exists in the language model, the probability distributions associated with the word class label can be considered to approximate the probability distributions associated with these unseen words (e.g., unseen entity names). In effect, through the language model containing word class labels, the vocabulary coverage of the language model (e.g., measured by the total number of words for which occurrence probabilities can be calculated) can be much larger than the vocabulary size and word class quantities actually contained in the language model. As such, the problems of poor recognition performance for vocabulary beyond the scope of the glossary, which is caused by the limited glossary capacity of the speech recognition system, can be addressed.

FIG. 1 is a flowchart of an acoustic language model training method in accordance with some embodiments.

As is shown in FIG. 1, the method includes:

Step 101: conduct word segmentation for language samples (e.g., textual sentences) in the training corpus by using a language model containing no word class labels, to obtain word segmentation data containing no word class labels.

Here, before conducting the word segmentation of the training corpus by using a language model containing no word class labels, in some preferred embodiments, normalization processing of the training corpus is performed. Normalization processing optionally includes: conversion of cases (e.g., between upper and lower cases), encoding conversions (e.g., between Unicode and other encodings), unifying time format, etc.

Specifically, various types of tokenizers (e.g., conventional language models trained on only language samples containing pure words and no word class labels) can be used as the initial language model, i.e., the language model containing no word class labels, to conduct word segmentation for the training corpus, to obtain the word segmentation results without word class labels.

In some embodiments, the language model without word class labels can be a mathematical model based on probability statistics theory, and to calculate the probability distributions associated with Chinese sentences. The language model is configured to make the probability of outputting a correct sentence (e.g., a sentence with the correct segmentation of words) greater than the probability of outputting erroneous sentences. For example, for the Chinese sentence "说明此处汉语语句的概率", in a statistical language model, the Chinese sentence can be decomposed or segmented into several discrete words, such as: "/说明//此处//汉语//语句//的//概率/

For a Chinese sentence containing m (m is a natural number) words e.g., $S=w_1w_2 \ldots w_m \overline{S} = \overline{w}_1 \overline{w}_2 \ldots \overline{w}_m S=w_1w_2 \ldots w_m$, according to the Bayes theory, the probability of this Chinese sentence (probability of this sentence being a correct output) can be decomposed into the arithmetic product of conditional probabilities containing more than one word, i.e.:

$$P(S) = P(w_1w_2 \ldots w_m) = \prod_{i=1}^{m} p(w_i / w_1w_2 \ldots w_{i-1});$$

In the above formula, $w_i$ is the ith word contained in the Chinese sentence S; and $p(w_i/w_1w_2 \ldots w_{i-1})$ is the conditional probability of the word $w_i$ appearing in the sentence $w_1w_2 \ldots w_m$.

From the above formula, it can be seen that the parametric space of the conditional probability $p(w_i/w_1w_2 \ldots w_{i-1})$ takes on an exponential growth with the increase of the variable i. When the variable i is large, with the limited size of the available training corpus, the probability value $p(w_i/w_1w_2 \ldots w_{i-1})$ cannot be correctly estimated.

The training corpus is a set containing ordered textual samples that have been organized and formed according to certain categories from a large amount of training text using statistical methods. The training corpus can be processed by computers in batches. Therefore, in the modeling methods of current practical language models, the conditional probability $p(w_i/w_1w_2 \ldots w_{i-1})$ is simplified to various degrees. Emerging from these modeling methods is the modeling method of the standard Ngram language model.

The standard Ngram language model is one of the most commonly used statistical language models at the present. In some embodiments, the standard Ngram language model regards a Chinese sentence as a Markov sequence, satisfying the Markov property. Specifically, the standard Ngram language model makes the following basic hypotheses for the conditional probability $p(w_i/w_1w_2 \ldots w_{i-1})$ in the statistical language model:

(1) The limited history hypothesis: the conditional probability of a word in the current input sentence is only related to the n−1 words preceding the word, instead of the whole Chinese sentence, where n is a preset natural number;

(2) The time homogeneity hypothesis: the conditional probability of the current word is not related to its position in the Chinese sentence.

Based on the above two hypotheses, the formula of probability calculation for a sentence under the standard Ngram language model can be simplified as:

$$P(S) = \prod_{i=1}^{m} p(w_i / w_{i-n+1}w_{i-n+2} \ldots w_{i-1});$$

In this way, based on the above two hypotheses, the conditional probability $p(w_i/w_1w_2 \ldots w_{i-1})$ in a standard statistical language model is simplified into the conditional probability in the standard Ngram language model $p(w_i/w_{i-n+1}w_{i-n+2} \ldots w_{i-1})p(w_i|w_{i-n+1} \ldots w_{i-1})$. In the latter formula of probability calculation, the number of history words related to the current words is fixed at a constant n−1, rather than a variable i−1 in the standard statistical language model. Thus, the size of parameter space for the whole language model is reduced, and the value of the Ngram probability can be correctly estimated on the basis of the currently available training corpus. Consequently, the standard Ngram language model can be reasonably practiced.

In the standard Ngram language model, estimation of the value of conditional probability $p(w_i/w_{i-n+1}w_{i-n+2} \ldots w_{i-1})$ adopts the method of maximum likelihood estimation, the estimation formula is as follows:

$$p(w_i / w_{i-n+1}w_{i-n+2} \ldots w_{i-1}) = \frac{c(w_{i-n+1} \ldots w_{i-1}w_i)}{c(w_{i-n+1} \ldots w_{i-2}w_{i-1})};$$

In the above formula, $C(w_{i-n+1} \ldots w_{i-1}w_i)$ represents the frequency of the word sequence $w_{i-n+1} \ldots w_{i-1}w_iw_{i-n+1} \ldots w_{i-1}w_i$ (a sub-sequence of words in the sentence) appearing in the training corpus of the standard Ngram language model.

In some embodiments, the word segmentation is conducted using a standard Ngram language model, to obtain word segmentation data containing no word class labels.

Step 102: perform word class replacement for the word segmentation data containing no word class labels to obtain first word segmentation data containing word class labels.

Here, a classifying glossary can be pre-established, where the vocabulary in this classifying glossary are classified according to word classes. In some embodiments, for an identified word $w_i$ in the word segmentation data (e.g., $w_1/w_2/ \ldots /w_i/ \ldots /w_m$) containing no word class labels, an identical word (e.g., $w_i$) can be retrieved from the pre-established classifying glossary, and the respective word class label (e.g., <label$_x$>) of the retrieved word is set as the respective word class label for the word in the word segmentation data (e.g., resulting in modified word segmentation data $W_1/w_2/ \ldots /<label_x>/ \ldots /w_m$).

For example, in some embodiments, supposing that the classifying glossary contains the word class label <家具> (meaning <furniture> in English). In the glossary, the words corresponding to the word class label <家具> include: 窗户 (meaning "window" in English), 桌子 (meaning "table" in English), 桌子 (meaning "chair" in English), 大门 (meaning "door" in English), etc. Moreover, the common word class label for these furniture words is <家具>. When the training corpus contains the Chinese sentence "我打开窗户" (meaning "I open the window" in English), the sentence is segmented as "/我/打开/窗户/". By comparing the segmented words in the word segmentation data "/我/打开/窗户/" with the known words in the classifying glossary, it can be determined that the segmented word "窗户" in the training corpus belongs to the 家具 word class, and has a word class label of <家具> in the classifying glossary. Thus, the segmented word "窗户" in the segmentation data is replaced with the word class label <家具> found in the classifying glossary, and the segmentation data containing no word class labels (e.g., "/我/打开/窗户/") is converted to the word segmentation data containing word class labels (e.g., "/我/打开/<家具>/").

Similarly, when the training corpus contains the Chinese sentence "我打开大门" (meaning "I open the door" in English), the sentence is segmented as "/我/打开/大门/". By comparing the segmented words in the word segmentation data "/我/打开/大门/" with the known words in the classifying glossary, it can be determined that the segmented word "大门" in the training corpus also belongs to the 家具 word class, and has a word class label of <家具> in the classifying glossary. Thus, the segmented word "大门" in the word segmentation data "/我/打开/大门/" is replaced with the word class label <家具>, resulting in the word segmentation data containing word class labels (e.g., "/我/打开/<家具>/").

Similarly, when the training corpus contains the Chinese sentence "我踢开桌了" (meaning "I kick away the table" in English), the sentence is segmented as "我/踢开/桌了/". By comparing the segmented words in the word segmentation data "我/踢开/桌子" with the known words in the classifying glossary, it can be determined that the segmented word "桌了" in the training corpus also belongs to the 家具 word class, and has a word class label of <家具> in the classifying glossary. Thus, the segmented word "桌子" in the segmentation data "我/踢开/桌子" is replaced with the word class label <家具>, resulting in the word segmentation data containing word class labels (e.g., "我/踢开/<家具>").

In some embodiments, after a known word that is the same as a segmented word in the word segmentation data containing no word class labels is identified and retrieved from the pre-established classifying glossary, the method further includes:

Determining whether the word length of the known word retrieved from the classifying glossary exceeds a preset threshold value of matching word length, and if so, setting the word class label of the retrieved known word as the word class label of the segmented word in the word segmentation data containing no word class labels. For example, in some embodiments, the preset threshold word length is two characters. In some embodiments, the preset threshold word length is one character. In some embodiments, the preset threshold word length is three characters. If the word length of the known word retrieved from the classifying glossary does not exceed the preset threshold value of matching word length, the word class label of the retrieved known word is not used to replace the segmented word in the word segmentation data. In some embodiments, two or more consecutive segmented words are combined as a single segmented word when searching for a matching known word of sufficient length in the classifying glossary, and if a match is found, the word class label of the retrieved known word is used to replace the two or more consecutive segmented words as a whole in the word segmentation data. In some embodiments, instead of checking the word length of a retrieved word, the word length is a segmented word is checked before it is used to look up the classifying glossary, and only segmented words that are longer than the preset threshold length are used to look up the classifying glossary.

Step 103: use the first word segmentation data containing word class labels to train a language model containing word class labels and use the language model containing word class labels to conduct word segmentation of the training corpus, in order to obtain second word segmentation data containing word class labels.

In some embodiments, the first word segmentation data containing word class labels include segmented training samples (e.g., Chinese sentences) in which at least one segmented word has been replaced with its corresponding word class label. In some embodiments, some segmented training samples in the first word segmentation data may include one or more word class labels among one or more original segmented words. In some embodiments, the word class replacement in Step 102 is performed in several different stages and according to one or more predetermined criteria. In some embodiments, in each stage of the word class replacement process, only certain words (e.g., words meeting a certain length requirement, words having a segmentation score above a certain threshold value, words of a certain word class, etc.) are replaced by their corresponding word class labels.

In some embodiments, the first word segmentation data containing word class labels are used as the training samples for an Ngram language model, such that each word class label in a respective training sample is treated in the same way as a word in the training sample. Since many words in the training samples of the original training corpus are now replaced by their corresponding word class labels, the number of unique training samples in the training corpus is reduced and the usage frequencies of the replaced words now contribute to the usage frequencies of their respective word class labels. Thus, the resulting language model trained on the first word segmentation data containing word class labels is smaller than the initial language model used in Step 101, and has a better accuracy and vocabulary coverage. In some embodiments, various methods of training the language model can be used.

In some embodiments, once the language model has been trained using the first word segmentation data containing word class labels, the language model can be used to segment sentences that include word class labels. In some embodiments, word class replacement is performed on the training samples in the original training corpus, such that at least some words in the training corpus are replaced with their corresponding word class labels found in the classifying glossary. In some embodiments, the same criteria used to determine whether to replace certain words with their corresponding word class labels used in Step 102 are used here to determine which words are to be replaced with their word class labels. In some embodiments, word class replacement need not be performed on the training samples of the original training corpus containing no word class labels in this Step; instead, the first word segmentation data (i.e., segmented training samples in which some segmented words have been replaced with their corresponding word class labels through the word class replacement process in Step 102) is provided as test inputs to the language model containing word class labels, to obtain the second word segmentation data containing word class labels.

Step 104: use the second word segmentation data containing word class labels to obtain the acoustic language model.

The second word segmentation data containing word class labels is likely to be different from the first segmentation data containing word class labels, because the language model containing word class labels obtained in Step 103 is a statistical summary of the first segmentation data containing word class labels. The second word segmentation data containing word class labels is likely to increasingly approximate the first segmentation data containing word class labels if the language model obtained in Step 103 becomes increasingly accurate. As will be described below, the process of obtaining a language mode containing word class labels, performing segmentation on the training corpus to obtain new segmentation data containing word class labels, and training the language model containing word class labels with the new segmentation data containing word class labels to obtain a new language model can be repeated for one or more iterations until a predetermined convergence condition is met. In some embodiments, the predetermined convergence condition is that the segmentation data obtained using the new language model is sufficiently similar to the segmentation data used to train the new language model. In some embodiments, the criterion for measuring the similarity between the segmentation data obtained using the new language model and the segmentation date used to train the new language model is whether the word class labels in the two sets of word segmentation data have the same locations.

In some embodiments, after the acoustic language model is obtained based on the second word segmentation data containing word class labels, the acoustic language model is ready to receive input and provide recognition results, including: receiving input speech, and performing speech recognition processing aimed at the input speech by the use of the acoustic language model.

In some embodiments, after the second word segmentation data containing word class labels is obtained, the method further includes:

Determining whether the first word segmentation data containing word class label has the same replacement position(s) of word class label(s) with the second word segmentation data containing word class labels, and if so, then using the second word segmentation data containing said word class label(s) to obtain the acoustic language model, if not, performing word class replacement for the second word segmentation data containing word class labels.

In some preferred embodiments of the present application, the process flow is iterative, namely, the language model containing word class labels goes through an iterative optimization process. In some embodiments, the process includes:

(1) At first, perform normalization processing of the training corpus;

(2) Then, a tokenizer uses an initial language model (e.g., a language model containing no word class labels) to perform word segmentation on training samples in the training corpus, and obtain word segmentation results (e.g., word segmentation data containing no word class labels);

(3) Conduct word class replacement for the word segmentation results based on a set of condition trigger rules to obtain word segmentation results containing word class labels. At this moment, in order to ensure accuracy rate, condition trigger rules can perform word class replacement of names of entities that meet preset certainty thresholds. If the word segmentation result containing word class labels obtained in a current iteration is same as the word segmentation result containing word class labels obtained in the previous iteration, the iterative process can be terminated and the post processing can be started;

(4) Use word segmentation data containing word class labels to train a language model and obtain a language model containing word class labels;

(5) The tokenizer uses the language model containing word class labels to perform word segmentation of the training corpus in accordance with word class labels of the words in the training corpus obtained in Step (1), obtain word segmentation data containing word class labels, and return to perform Step (3) in a next iteration. At this moment, because the use of a statistical language model may create word class replacement that the triggering rules fail to match with, and owing to the changes in the word segmentation result, the original position which can match with the trigger rules may be no longer valid. As such, the decision regarding whether to continue the iterative process of Steps (3)-(5) can result in the continuation of the iterative process until the language model is sufficiently accurate and the segmentation results of two iterations converge.

After that, post processing suitable for speech recognition can be performed on the word segmentation result containing word class labels; and the word segmentation result can be used to train the acoustic language model containing word class labels.

Figure 1B:
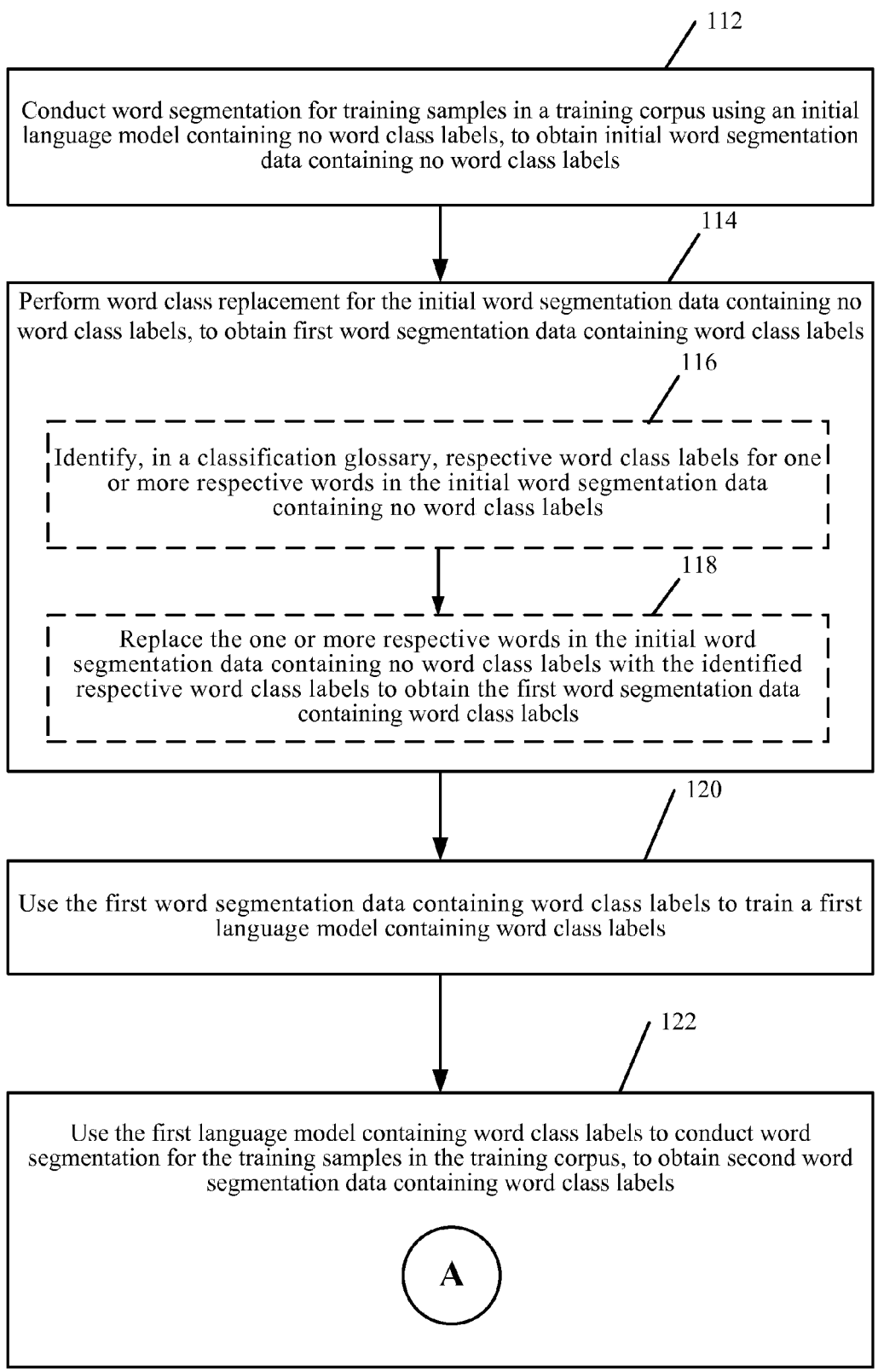
FIGS. 1B-1C is a flowchart diagram of an acoustic language model training method in accordance with some embodiments.
Figure 1C:
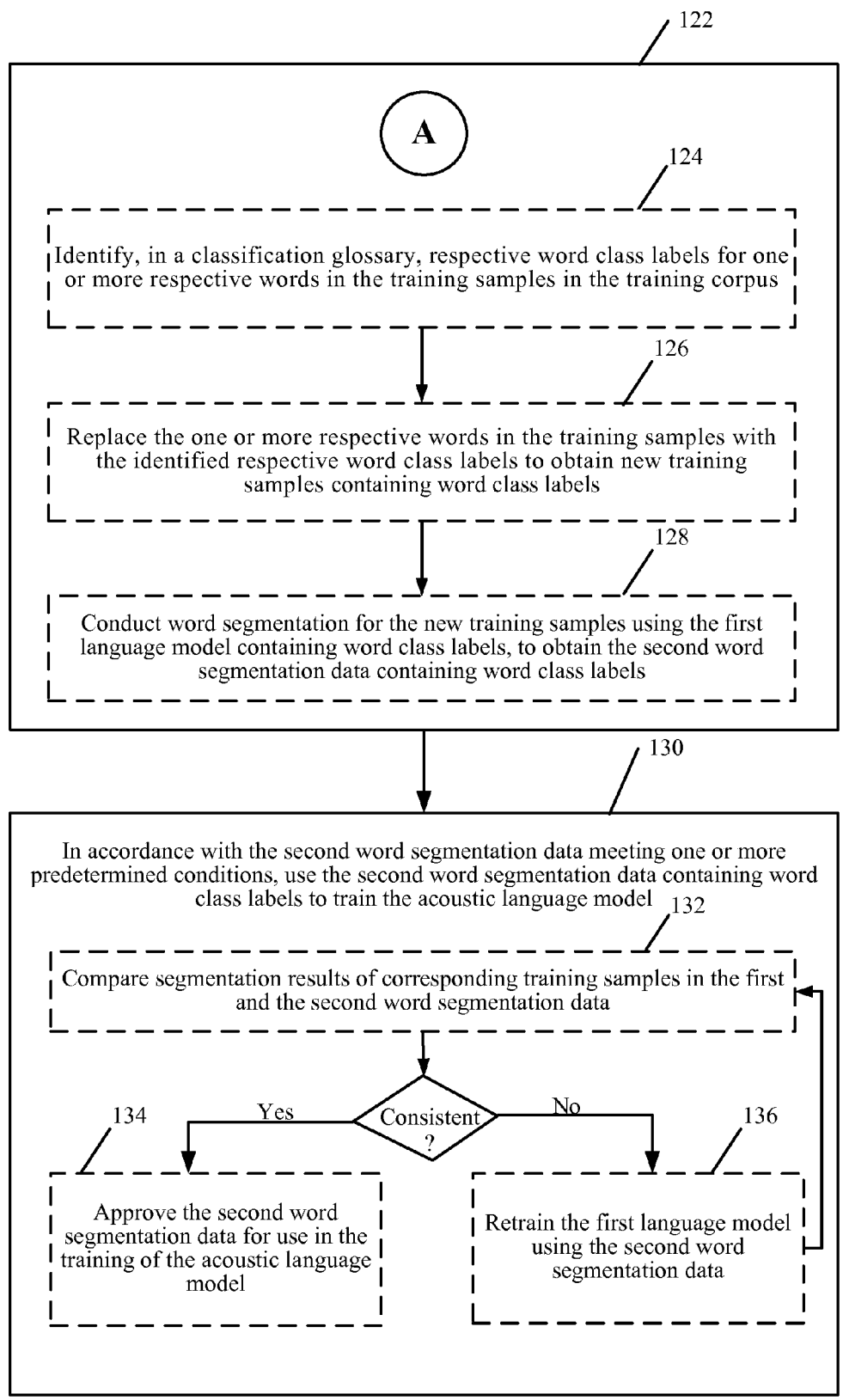

FIGS. 1B-1C is a flow chart of the above method of training an acoustic language model in accordance with some embodiments.

In some embodiments, at a device having one or more processors and memory: word segmentation is conducted (112) for training samples in a training corpus using an initial language model containing no word class labels, to obtain initial word segmentation data containing no word class labels.

Then, word class replacement for the initial word segmentation data containing no word class labels is performed (114) to obtain first word segmentation data containing word class labels.

In some embodiments, when performing word class replacement for the initial word segmentation data containing no word class labels, to obtain first word segmentation data containing word class labels: respective word class labels for one or more respective words in the initial word segmentation data containing no word class labels are identified (116) in a classification glossary. The one or more respective words in the initial word segmentation data containing no word class labels are then replaced (118) with the identified respective word class labels to obtain the first word segmentation data containing word class labels.

In some embodiments, the first word segmentation data containing word class labels is (120) used to train a first language model containing word class labels.

In some embodiments, after training, the first language model containing word class labels is (122) used to conduct word segmentation for the training samples in the training corpus, to obtain second word segmentation data containing word class labels.

In some embodiments, when using the first language model containing word class labels to conduct word segmentation for the training samples in the training corpus, to obtain second word segmentation data containing word class labels: respective word class labels for one or more respective words in the training samples in the training corpus are identified (124) in a classification glossary; the one or more respective words in the training samples are replaced (126) with the identified respective word class labels to obtain new training samples containing word class labels; and word segmentation for the new training samples is conducted (128) using the first language model containing word class labels, to obtain the second word segmentation data containing word class labels.

In some embodiments, in accordance with the second word segmentation data meeting one or more predetermined conditions, the second word segmentation data containing word class labels is used (130) to train the acoustic language model.

In some embodiments, after obtaining the second word segmentation data containing word class labels: segmentation results of corresponding training samples in the first and the second word segmentation data are compared (132). In accordance with a determination that the first word segmentation data is consistent with the second word segmentation data, the second word segmentation data is approved (134) for use in the training of the acoustic language model. In some embodiments, after obtaining the second word segmentation data containing word class labels: in accordance with a determination that the first word segmentation data is inconsistent with the second word segmentation data, the first language model is retrained (136), e.g., using the second word segmentation data.

In some embodiments, after the first language model is retrained, the word segmentation for the second training sample is repeated using the first language model containing word class labels, to obtain revised second word segmentation data. In some embodiments, in accordance with a determination that the revised second word segmentation data is consistent with the second word segmentation data, approving the revised second word segmentation data for use in the training of the acoustic language model.

In some embodiments, after obtaining the second word segmentation data containing word class labels: in accordance with a determination that the first word segmentation data is inconsistent with the second word segmentation data, the first word segmentation data containing word class labels are revised with different word class replacement from before. The first language model is retrained using the revised first word segmentation data to obtain a revised first language model. The revised first language model is used to perform segmentation on the training corpus, to obtain revised second word segmentation data. In some embodiments, in accordance with a determination that the revised second word segmentation data is consistent with the revised first word segmentation data, the revised second word segmentation data is approved for use in the training of the acoustic language model.

In some embodiments, a determining that the first word segmentation data is consistent with the second word segmentation data further comprises a determination that respective word class label replacements in the first word segmentation data are identical to respective word class label replacements in the second word segmentation data.

Figure 2:
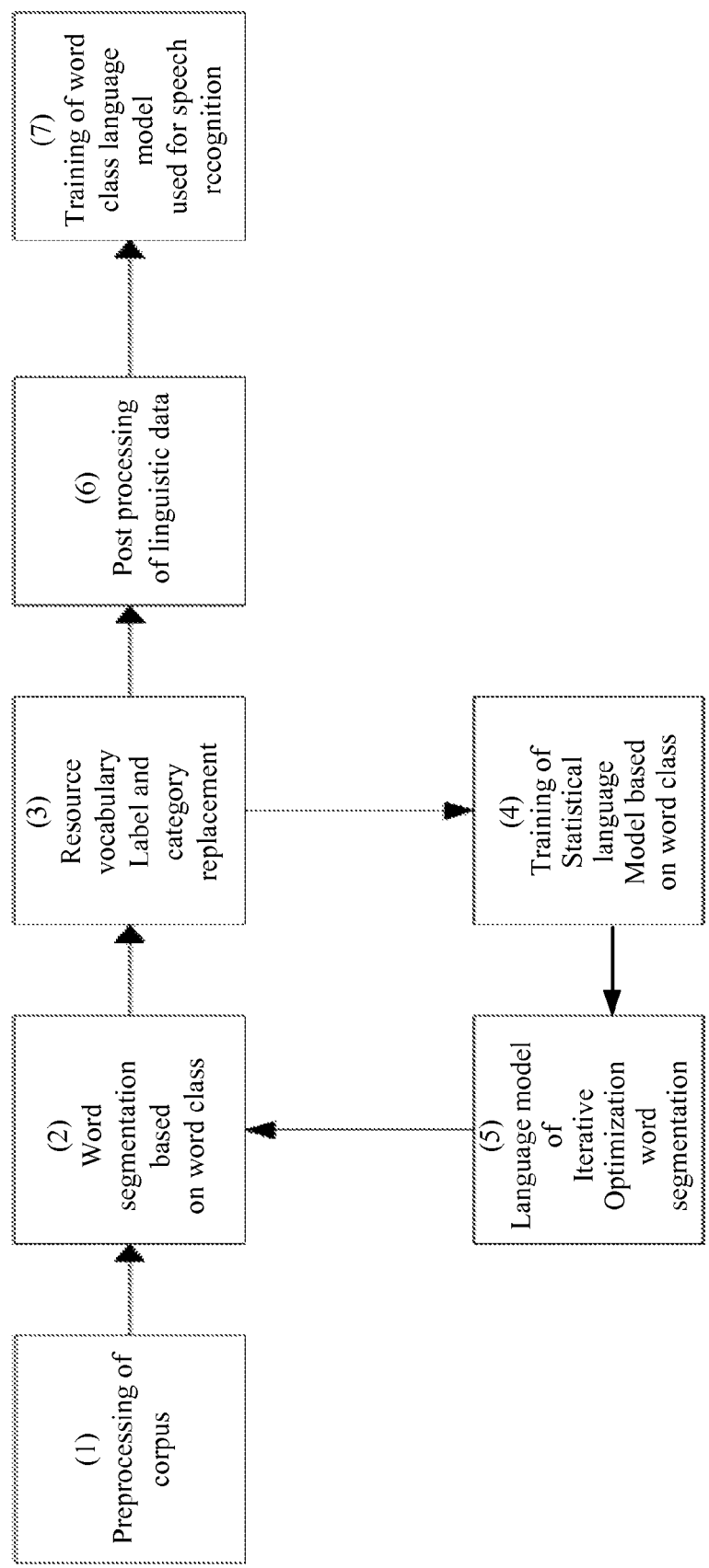
FIG. 2 is an overall schematic processing flow of acoustic language model training in accordance with some embodiments.

FIG. 2 is the overall schematic diagram of acoustic language model training method based on the embodiment of the present application. As described in FIGS. 1A-C, in some embodiments, the process shown in FIG. 2 includes: (1) preprocessing of the training corpus, followed by (2) word segmentation based on word class (e.g., using a language model containing word class labels), followed by (3) word class replacement (e.g., additional or revised word class replacement), followed by (4) training of an improved language model using the new training data (e.g., word segmentation data obtained from previous language model, modified with additional or revised word class replacement), (5) the process of (2)-(4) can repeat multiple iterations to improve the language model in each additional iteration; once a set of predetermined criteria (e.g., word segmentation data used to train the current language model, and word segmentation data obtained from the current language model are consistent with each other), then, the cycle of (2)-(4) can be broken, and (6) the segmentation data last obtained from the language model is post processed, and (7) used in the training of a language model (an acoustic language model) that is used in speech recognition.

As shown in FIG. 2, according to aforementioned specific analysis, in some embodiments, for the word segmentation phase, optimization not only matches pattern words, dictionary words, but also performs replacement of word class labels for matched words based on word class resource (e.g., classifying glossary) during the process of the full segmentation. For the word segmentation phase, during the process of optimization selection based on probability path of Hidden Markov Model, word class parameters in a language model can be used to calculate the probability for a word class. If the optimum path includes a word class label, then the word class label will be output directly as a word segmentation result. In the phase of word class replacement based on the resource, data of word class replacement shall be reliable resource data instead of unlisted words originating from automatic recognition. It shows that replacement method of vocabulary word class is a combination of two methods including trigger rules and statistical language model.

In the embodiment of the present application, trigger rules only perform word class replacement for the guaranteed parts, and through the iteration of language model based on word class, the percentage of coverage of word class replacement can be improve gradually. In the embodiment of the present application, classifying vocabulary serving as segmentation resource participates in the matching processing of word segmentation, and is involved in the calculation of the optimum probability path by using probability parameter of word class, and allows the winning word class vocabulary to be shown in the word segmentation result in the form of classifying labels.

Based on the aforementioned specific analysis, the embodiment of the present application also puts forward a kind of acoustic language model training device.

Figure 3:
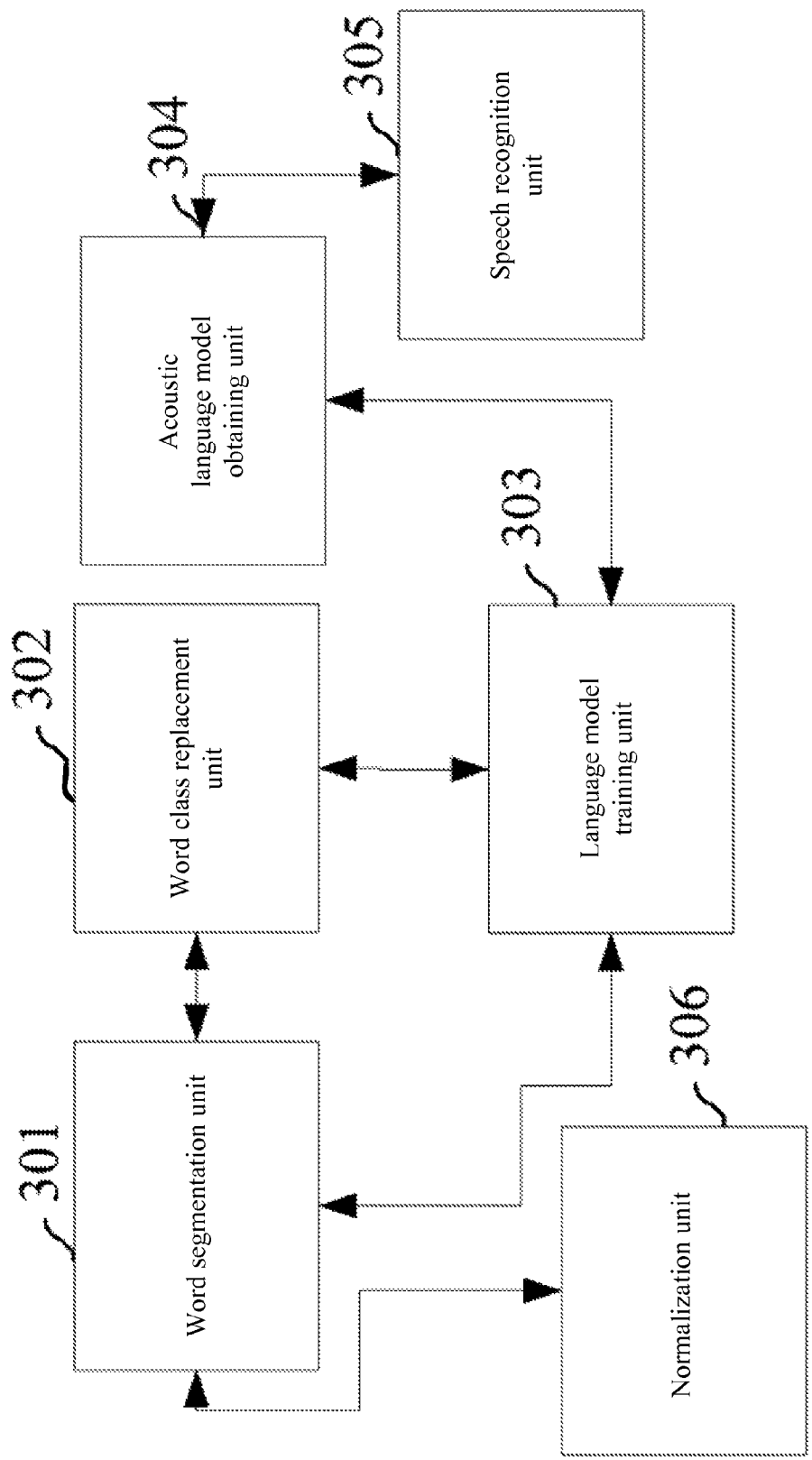
FIG. 3 is a block diagram for an apparatus for acoustic language model training in accordance with some embodiments.

FIG. 3 is the device structural diagram of acoustic language model training method in accordance with some embodiments.

This device includes word segmentation unit 301, word class replacement unit 302, language model training unit 303 and acoustic language model obtaining unit 304, wherein:

Word segmentation unit 301 uses a language model without word class labels to perform word segmentation for a training corpus, in order to obtain word segmentation data without word class labels;

Word class replacement unit 302 is used to perform word class replacement for word segmentation data without word class labels to obtain first word segmentation data with word class labels;

Language model training unit 303 is used to train a language model containing word class labels using the first word segmentation data with word class labels, and use the language model containing word class labels to conduct word segmentation of the training corpus, in order to obtain second word segmentation data containing word class labels;

Acoustic language model obtaining unit 304 uses the second word segmentation data containing word class labels to obtain an acoustic language model.

In some embodiments, word class replacement unit 302 is used to retrieve, from a pre-established classifying glossary, known words that are identical to segmented words in the word segmentation data without word class labels, and set the respective word class labels of the retrieved known words as the respective word class labels of the segmented words in the word segmentation data without word class labels.

In some embodiments, language model training unit 303 is used further to determine whether the first word segmentation data with word class labels has the same replacement positions of word class labels with the second word segmentation data with word class labels, after the second word segmentation data with word class labels is obtained. If so, the acoustic language model obtaining unit is enabled, if not, word class replacement unit is enabled to perform word class replacement for the second word segmentation data with word class labels.

In some embodiments, word class replacement unit 302 is used to further determine whether the retrieved vocabulary length from classifying glossary exceeds a preset threshold value of matching word length after the vocabulary same with the word segmentation data without word class labels is retrieved from the pre-established classifying glossary. If so, the word class labels of the retrieved vocabulary are set as the word class labels of retrieved words in the word segmentation data without word class labels.

In an embodiment, word class replacement unit 302 is used to further determine whether the occurrence frequency of retrieved vocabulary from the classifying glossary exceeds a preset threshold value of word frequency after a known word that is identical to a segmented word in the word segmentation data without word class labels is retrieved from the pre-established classifying glossary. If so, the word class label of the retrieved known word is set as the word class label of the segmented word in the word segmentation data without word class labels.

Preferably, this apparatus includes further speech recognition unit 305;

Speech recognition unit 305 is used to receive input speech, and perform speech recognition processing aimed at input speech by using the acoustic language model.

Preferably, this device includes further normalization unit 306;

Normalization unit 306 is used to conduct normalization processing for the training corpus before conducting the word segmentation for the training corpus by using language model without word class labels.

It is acceptable to integrate the device shown in FIG. 3 into hardware entities of a variety of networks. For example, the acoustic language model training device can be integrated into: devices such as feature phones, smartphones, palmtop computers, personal computer (PC), tablet computer, or personal digital assistant (PDA), etc.

In fact, there are various forms to implement specifically the acoustic language model training device mentioned in the embodiments of the present application. For example, through application interface following certain specifications, the acoustic language model training device can be written as a plug-in installed in a browser, and packaged as an application used for downloading by users themselves as well. When written as a plug-in, it can be implemented in various plug-in formats, including ocx, dll, cab, etc. It is also acceptable to implement the acoustic language model training device mentioned in the embodiments of the present application through specific technologies including Flash plug-in, RealPlayer plug-in, MMS plug-in, MI stave plug-in, ActiveX plug-in, etc.

Through storage methods of instruction or instruction set, the acoustic language model training method mentioned in the embodiments of the present application can be stored in various storage media. These storage media include but not limited to: floppy disk, CD, DVD, hard disk, Nand flash, USB flash disk, CF card, SD card, MMC card, SM card, Memory Stick (Memory Stick), xD card, etc.

In addition, the acoustic language model training method mentioned in the embodiments of the present application can also be applied to storage medium based on Nand flash, for example, USB flash disk, CF card, SD card, SDHC card, MMC card, SM card, Memory Stick, xD card and so on.

In summary, some embodiments of the present application include: conducting the word segmentation for the training corpus by using a language model without word class labels, to obtain word segmentation data without word class labels; performing word class replacement for the word segmentation data without word class label to obtain first word segmentation data with word class labels; training a language model with word class labels using the first word segmentation data with word class labels, and using the language model with word class labels to conduct word segmentation of the training corpus, in order to obtain second word segmentation data with word class labels; using the second word segmentation data with word class labels to obtain an acoustic language model. Thus it can be seen that the acoustic language model training based on word segmentation of word classes can be fulfilled after the application of the embodiments of the present application. The embodiments of the present application can use word class labels to replace all of the entity names of the same class in a language model training corpus, consequently reducing number of vocabulary in the language model. In addition, when calculating the probability associated with entity names of the same word class, the same parameters corresponding to the word class label in the language model can be used. The embodiment of the present application expands the vocabulary coverage of the language model, therefore improving recognition accuracy rate of speech recognition system.

In addition, embodiments of the present application address the problems of poor recognition results for out-of-vocabulary words caused by the limited glossary capacity of a speech recognition system.

Figure 4:
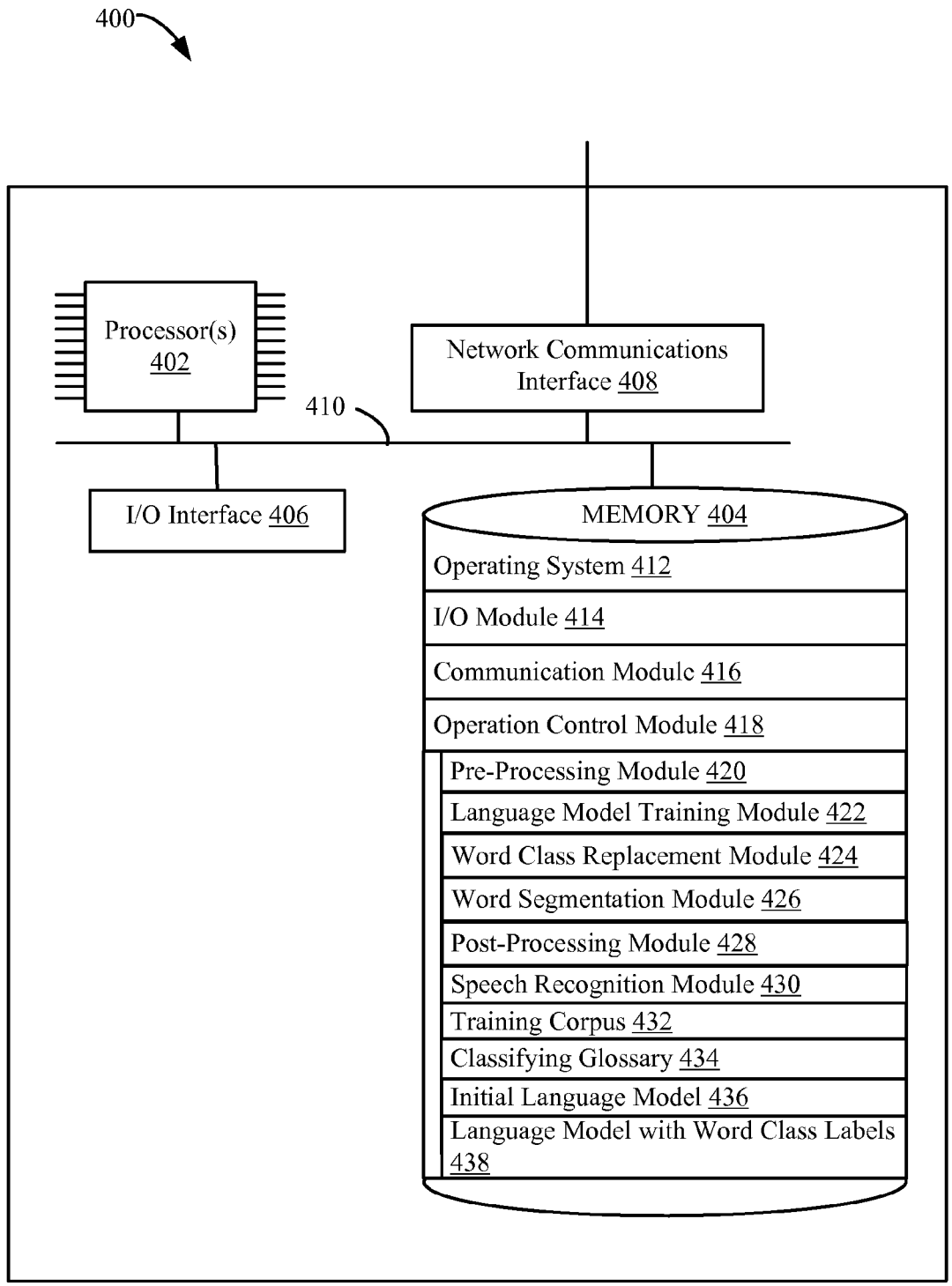
FIG. 4 is a block diagram for an apparatus for acoustic language model training in accordance with some embodiments.

FIG. 4 is a block diagram of a system 400 that implements the present application in accordance with some embodiments. In some embodiments, the system 400 is one of multiple processing apparatuses participating in the training, segmentation, and recognition processes described above. In some embodiments, the system 400 represents a single machine having multiple processing units for performing the functions and processes described above.

As shown in FIG. 4, the system 400 includes one or more processing units (or "processors") 402, memory 404, an input/output (I/O) interface 406, and a network communications interface 408. These components communicate with one another over one or more communication buses or signal lines 410. In some embodiments, the memory 404, or the computer readable storage media of memory 404, stores programs, modules, instructions, and data structures including all or a subset of: an operating system 412, an I/O module 414, a communication module 416, and an operation control module 418. The one or more processors 402 are coupled to the memory 404 and operable to execute these programs, modules, and instructions, and reads/writes from/to the data structures.

In some embodiments, the processing units 402 include one or more microprocessors, such as a single core or multicore microprocessor. In some embodiments, the processing units 402 include one or more general purpose processors. In some embodiments, the processing units 402 include one or more special purpose processors. In some embodiments, the processing units 402 include one or more personal computers, mobile devices, handheld computers, tablet computers, or one of a wide variety of hardware platforms that contain one or more processing units and run on various operating systems.

In some embodiments, the memory 404 includes high-speed random access memory, such as DRAM, SRAM, DDR RAM or other random access solid state memory devices. In some embodiments the memory 404 includes non-volatile memory, such as one or more magnetic disk storage devices, optical disk storage devices, flash memory devices, or other non-volatile solid state storage devices. In some embodiments, the memory 404 includes one or more storage devices remotely located from the processing units 402. The memory 404, or alternately the non-volatile memory device(s) within the memory 404, comprises a computer readable storage medium.

In some embodiments, the I/O interface 406 couples input/output devices, such as displays, a keyboards, touch screens, speakers, and microphones, to the I/O module 414 of the system 400. The I/O interface 406, in conjunction with the I/O module 414, receive user inputs (e.g., voice input, keyboard inputs, touch inputs, etc.) and process them accordingly. The I/O interface 406 and the user interface module 414 also present outputs (e.g., sounds, images, text, etc.) to the user according to various program instructions implemented on the system 400.

In some embodiments, the network communications interface 408 includes wired communication port(s) and/or wireless transmission and reception circuitry. The wired communication port(s) receive and send communication signals via one or more wired interfaces, e.g., Ethernet, Universal Serial Bus (USB), FIREWIRE, etc. The wireless circuitry receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, Wi-MAX, or any other suitable communication protocol. The network communications interface 608 enables communication between the system 600 with networks, such as the Internet, an intranet and/or a wireless network, such as a cellular telephone network, a wireless local area network (LAN) and/or a metropolitan area network (MAN), and other devices. The communications module 616 facilitates communications between the system 400 and other devices (e.g., other devices participating in the parallel training and/or decoding processes) over the network communications interface 608.

In some embodiments, the operating system 402 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

As shown in FIG. 4, the system 400 stores the operation control module 418 in the memory 404. In some embodiments, the operation control module 418 further includes the followings sub-modules, or a subset or superset thereof: a preprocessing module 420, a language model training module 422, a word class replacement module 424, a word seg-mentation module 426, a post-processing module 428, and a speech recognition module 430. In addition, each of these modules has access to one or more of the following data structures and data sources of the operation control module 418, or a subset or superset thereof: a training corpus 432, a classifying glossary 434, an initial language model without word class labels 436, and a language model with word class labels 438. In some embodiments, the operation control module 418 optionally includes one or more other modules to provide other related functionalities described herein. More details on the structures, functions, and interactions of the sub-modules and data structures of the operation control module 418 are provided with respect to FIGS. 1A-3, and accompanying descriptions.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of training an acoustic language model, comprising:
at a device having one or more processors and memory:
conducting word segmentation for training samples in a training corpus using an initial language model containing no word class labels, to obtain initial word segmentation data containing no word class labels;
performing word class replacement for the initial word segmentation data containing no word class labels, to obtain first word segmentation data containing word class labels;
using the first word segmentation data containing word class labels to train a first language model containing word class labels;
using the first language model containing word class labels to conduct word segmentation for the training samples in the training corpus, to obtain second word segmentation data containing word class labels; and
in accordance with the second word segmentation data meeting one or more predetermined criteria, using the second word segmentation data containing word class labels to train the acoustic language model.

2. The method of claim 1, wherein performing word class replacement for the initial word segmentation data containing no word class labels, to obtain first word segmentation data containing word class labels further comprises:
identifying, in a classification glossary, respective word class labels for one or more respective words in the initial word segmentation data containing no word class labels; and
replacing the one or more respective words in the initial word segmentation data containing no word class labels with the identified respective word class labels to obtain the first word segmentation data containing word class labels.

3. The method of claim 1, wherein using the first language model containing word class labels to conduct word segmentation for the training samples in the training corpus, to obtain second word segmentation data containing word class labels further comprises:

identifying, in a classification glossary, respective word class labels for one or more respective words in the training samples in the training corpus;

replacing the one or more respective words in the training samples with the identified respective word class labels to obtain new training samples containing word class labels; and conducting word segmentation for the new training samples using the first language model containing word class labels, to obtain the second word segmentation data containing word class labels.

4. The method of claim 3, further comprising:
after obtaining the second word segmentation data containing word class labels:
comparing segmentation results of corresponding training samples in the first and the second word segmentation data; and
in accordance with a determination that the first word segmentation data is consistent with the second word segmentation data, approving the second word segmentation data for use in the training of the acoustic language model.

5. The method of claim 4, further comprising:
after obtaining the second word segmentation data containing word class labels:
in accordance with a determination that the first word segmentation data is inconsistent with the second word segmentation data, retrain the first language model using the second word segmentation data.

6. The method of claim 5, further comprising:
after the first language model is retrained, repeating the word segmentation for the second training sample using the first language model containing word class labels, to obtain revised second word segmentation data; and
in accordance with a determination that the revised second word segmentation data is consistent with the second word segmentation data, approving the revised second word segmentation data for use in the training of the acoustic language model.

7. The method of claim 4, wherein a determining that the first word segmentation data is consistent with the second word segmentation data further comprises a determination that respective word class label replacements in the first word segmentation data are identical to respective word class label replacements in the second word segmentation data.

8. A system for training an acoustic language model, comprising:
one or more processors; and
memory having instructions stored thereon, the instructions, when executed by the one or more processors, cause the processors to perform operations comprising:
conducting word segmentation for training samples in a training corpus using an initial language model containing no word class labels, to obtain initial word segmentation data containing no word class labels;
performing word class replacement for the initial word segmentation data containing no word class labels, to obtain first word segmentation data containing word class labels;
using the first word segmentation data containing word class labels to train a first language model containing word class labels;
using the first language model containing word class labels to conduct word segmentation for the training samples in the training corpus, to obtain second word segmentation data containing word class labels; and in accordance with the second word segmentation data meeting one or more predetermined criteria, using the second word segmentation data containing word class labels to train the acoustic language model.

9. The system of claim 8, wherein performing word class replacement for the initial word segmentation data containing no word class labels, to obtain first word segmentation data containing word class labels further comprises:
identifying, in a classification glossary, respective word class labels for one or more respective words in the initial word segmentation data containing no word class labels; and
replacing the one or more respective words in the initial word segmentation data containing no word class labels with the identified respective word class labels to obtain the first word segmentation data containing word class labels.

10. The system of claim 8, wherein using the first language model containing word class labels to conduct word segmentation for the training samples in the training corpus, to obtain second word segmentation data containing word class labels further comprises:
identifying, in a classification glossary, respective word class labels for one or more respective words in the training samples in the training corpus;
replacing the one or more respective words in the training samples with the identified respective word class labels to obtain new training samples containing word class labels; and
conducting word segmentation for the new training samples using the first language model containing word class labels, to obtain the second word segmentation data containing word class labels.

11. The system of claim 10, wherein the operations further comprise:
after obtaining the second word segmentation data containing word class labels:
comparing segmentation results of corresponding training samples in the first and the second word segmentation data; and
in accordance with a determination that the first word segmentation data is consistent with the second word segmentation data, approving the second word segmentation data for use in the training of the acoustic language model.

12. The system of claim 11, wherein the operations further comprise:
after obtaining the second word segmentation data containing word class labels:
in accordance with a determination that the first word segmentation data is inconsistent with the second word segmentation data, retrain the first language model using the second word segmentation data.

13. The system of claim 12, wherein the operations further comprise:
after the first language model is retrained, repeating the word segmentation for the second training sample using the first language model containing word class labels, to obtain revised second word segmentation data; and
in accordance with a determination that the revised second word segmentation data is consistent with the second word segmentation data, approving the revised second word segmentation data for use in the training of the acoustic language model.

14. The system of claim 11, wherein a determining that the first word segmentation data is consistent with the second word segmentation data further comprises a determination that respective word class label replacements in the first word segmentation data are identical to respective word class label replacements in the second word segmentation data.

15. A non-transitory computer-readable medium for training an acoustic language model, having instructions stored thereon, the instructions, when executed by one or more processors, cause the processors to perform operations comprising:
   conducting word segmentation for training samples in a training corpus using an initial language model containing no word class labels, to obtain initial word segmentation data containing no word class labels;
   performing word class replacement for the initial word segmentation data containing no word class labels, to obtain first word segmentation data containing word class labels;
   using the first word segmentation data containing word class labels to train a first language model containing word class labels;
   using the first language model containing word class labels to conduct word segmentation for the training samples in the training corpus, to obtain second word segmentation data containing word class labels; and
   in accordance with the second word segmentation data meeting one or more predetermined criteria, using the second word segmentation data containing word class labels to train the acoustic language model.

16. The computer-readable medium of claim 15, wherein performing word class replacement for the initial word segmentation data containing no word class labels, to obtain first word segmentation data containing word class labels further comprises:
   identifying, in a classification glossary, respective word class labels for one or more respective words in the initial word segmentation data containing no word class labels; and
   replacing the one or more respective words in the initial word segmentation data containing no word class labels with the identified respective word class labels to obtain the first word segmentation data containing word class labels.

17. The computer-readable medium of claim 15, wherein using the first language model containing word class labels to conduct word segmentation for the training samples in the training corpus, to obtain second word segmentation data containing word class labels further comprises:
   identifying, in a classification glossary, respective word class labels for one or more respective words in the training samples in the training corpus;
   replacing the one or more respective words in the training samples with the identified respective word class labels to obtain new training samples containing word class labels; and
   conducting word segmentation for the new training samples using the first language model containing word class labels, to obtain the second word segmentation data containing word class labels.

18. The computer-readable medium of claim 17, wherein the operations further comprise:
   after obtaining the second word segmentation data containing word class labels:
      comparing segmentation results of corresponding training samples in the first and the second word segmentation data; and
      in accordance with a determination that the first word segmentation data is consistent with the second word segmentation data, approving the second word segmentation data for use in the training of the acoustic language model.

19. The computer-readable medium of claim 18, wherein the operations further comprise:
   after obtaining the second word segmentation data containing word class labels:
      in accordance with a determination that the first word segmentation data is inconsistent with the second word segmentation data, retrain the first language model using the second word segmentation data.

20. The computer-readable medium of claim 19, wherein the operations further comprise:
   after the first language model is retrained, repeating the word segmentation for the second training sample using the first language model containing word class labels, to obtain revised second word segmentation data; and
   in accordance with a determination that the revised second word segmentation data is consistent with the second word segmentation data, approving the revised second word segmentation data for use in the training of the acoustic language model.

* * * * *